Patented Feb. 24, 1931

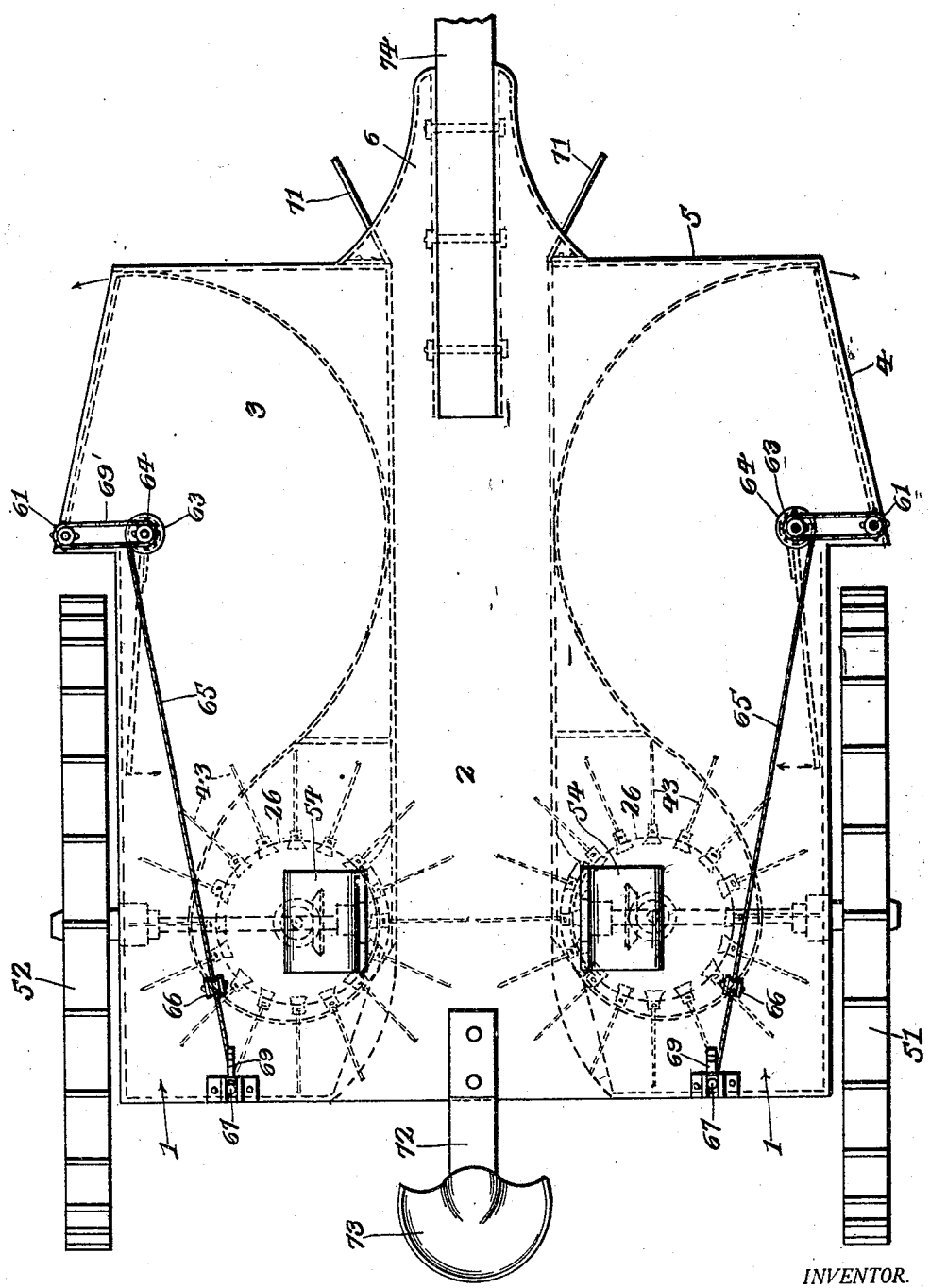

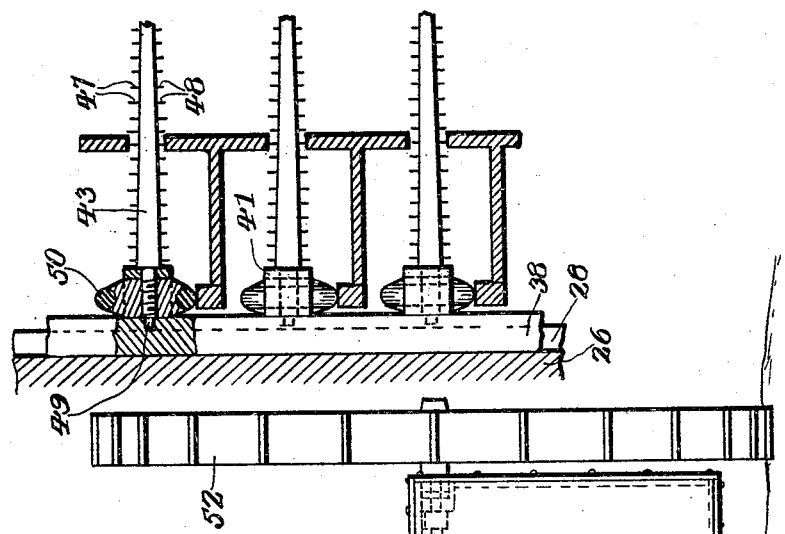

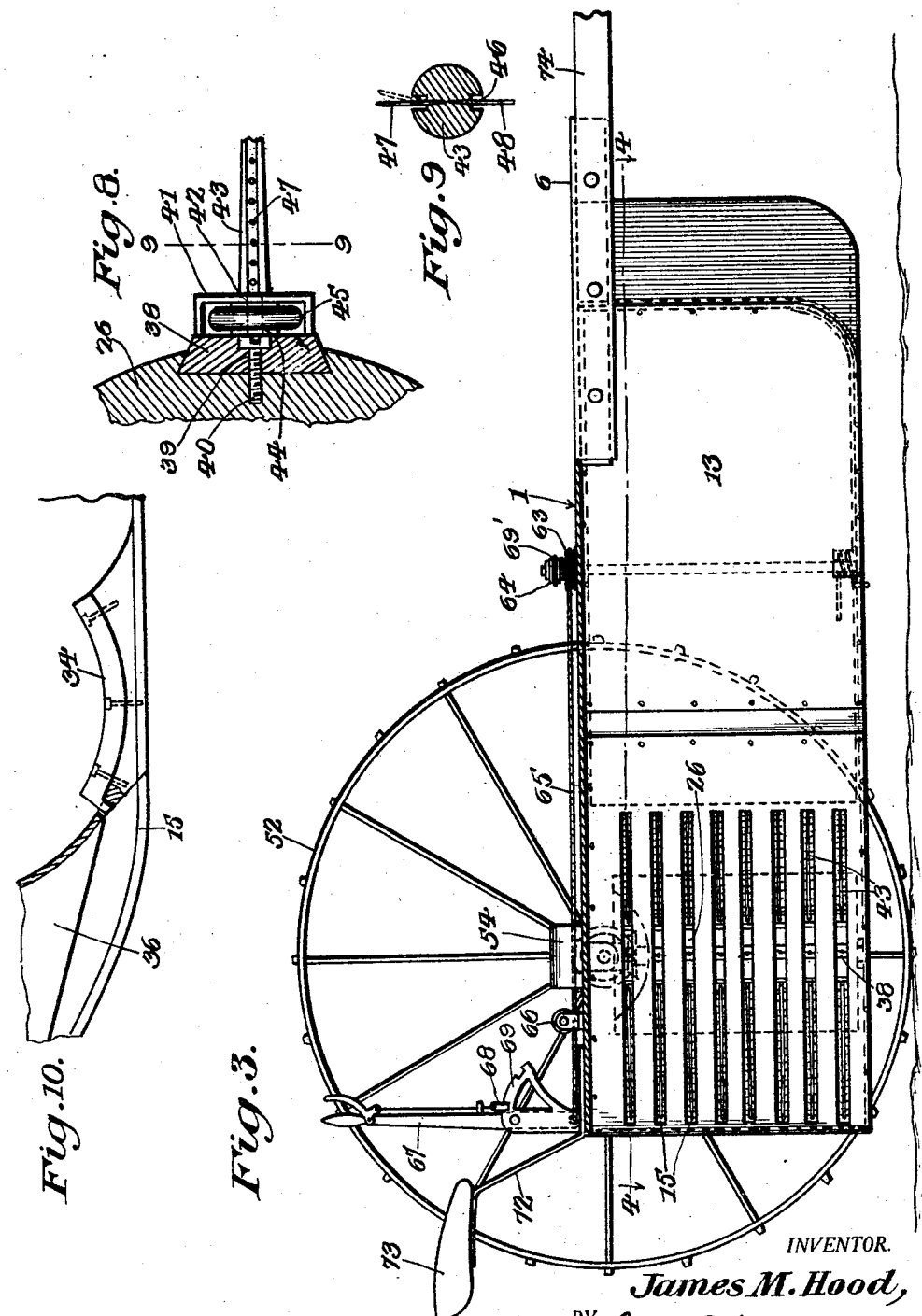

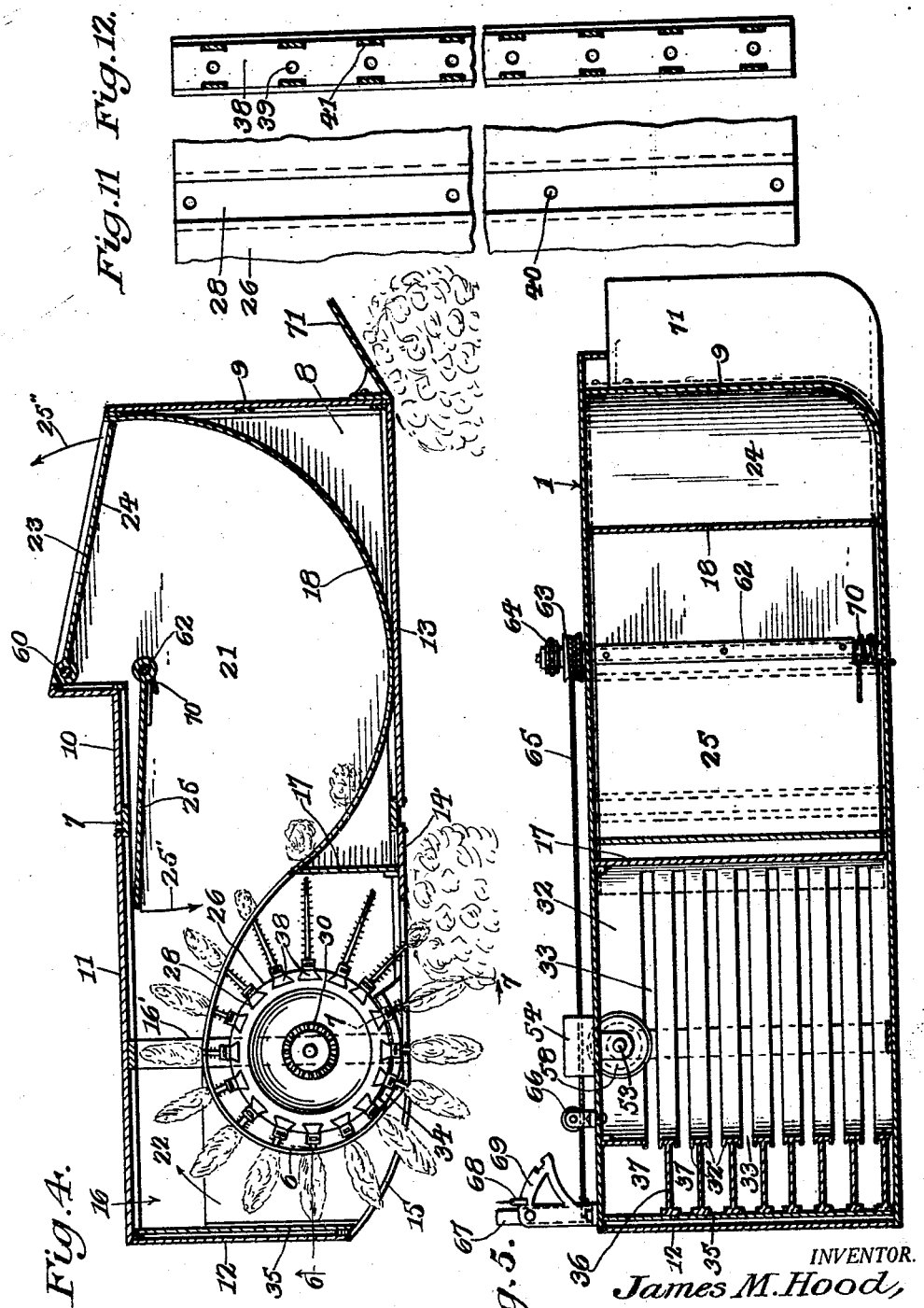

1,794,293

UNITED STATES PATENT OFFICE

JAMES M. HOOD, OF COLORADO, TEXAS

COTTON PICKER

Application filed March 16, 1928. Serial No. 262,217.

This invention relates to cotton pickers, and has for its object to provide, in a manner as hereinafter set forth a machine of the class referred to so constructed and arranged as to straddle a row of cotton plants and whereby on the travel of the machine it will act upon both sides of the plants to thoroughly pick the cotton therefrom and then collect and store the picked cotton.

A further object of the invention is to provide, in a manner as hereinafter set forth, a cotton picker including means for picking and storing the picked cotton and further including means for discharging the stored cotton in bulk from the machine when desired.

Further objects of the invention are to provide, in a manner as hereinafter set forth, a cotton picker which is comparatively simple in its construction and arrangement, strong, durable, compact, thoroughly efficient in its use, readily assembled, expeditious in its action, conveniently controlled, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a top plan view of a cotton picker in accordance with this invention.

Figure 2 is a rear elevation partly broken away.

Figure 3 is a longitudinal sectional view thereof.

Figure 4 is a fragmentary view in sectional plan taken on line 4—4 Figure 3.

Figure 5 is a fragmentary view in longitudinal section.

Figure 6 is a section on line 6—6 Figure 4.

Figure 7 is a section on line 7—7 Figure 4.

Figure 8 is a fragmentary view partly in section and partly in plan illustrating a picker drum and a picker member.

Figure 9 is a section on line 9—9 Figure 8.

Figure 10 is a sectional detail.

Figure 11 is a fragmentary view in elevation and broken away of the drum.

Figure 12 is a sectional elevation, broken away, of a carrier for a set of picker members.

A cotton picker machine in accordance with this invention comprises a platform or top plate referred to generally at 1 and formed of a narrow portion 2 and a wide portion 3 and with the latter arranged forwardly of the former. The portion 3 projects laterally with respect to each side of the portion 2 and has its side edges 4 extending from the rear ends thereof at an inclination to the forward edge 5 of said portion 3. Extending forwardly from the portion 3, centrally thereof, is a tapered extension 6. The width of the portion 3 is materially less than the length of the portion 2.

Suspended from the platform 1 and arranged in opposed spaced relation is a pair of frames 7 of like construction. Each frame extends from the rear end to the forward end of the plate 1. The arrangement of each frame 7 with respect to the plate 1 is as shown in Figure 4.

Secured to the lower end of each frame 7 is a bottom plate 8. Secured to the front of each frame 7 is a front plate 9. Each frame 7 is open at the forward portion of the outer side thereof and in this connection see Figure 4. Secured to the outer side of each frame 7, adjacent the open portion of said side is an angle shaped side plate 10. Secured to the outer side of each frame 7, adjacent the plate 10 is a side plate 11. Secured to the rear end of each frame 7 is a rear plate 12. Secured to the forward portion of the inner side of each frame 7 is a side plate 13. Secured to the rear portion of the inner side of each frame 7 and extending to the plate 12 is a side plate 14 provided with a series of superposed guide slots 15. See Figures 3 and 4.

The plates 9, 10, 11, 12, 13 and 14 extend from the plate 8 to the plate 1. Each frame 7 in proximity to its rear end at its lower end is formed with a transversely extending support 16' for a purpose to be presently referred to. See Figure 4. The setting up of the pair of frames 7, in connection with the plates 8 to 14 which are secured to each frame, and further in connection with the top plate 1, provides a pair of compartments positioned below and at each side of the plate 1. Each compartment is indicated at 16, see Figure 4. The inner side of each compartment is formed by the plates 13, 14. The inner side of one compartment is spaced a substantial distance from the inner side of the other compartment. See Figure 2. Secured to each plate 14, in proximity to its forward end, is a vertically disposed partition member 17 which constitutes a support. See Figure 4. The partition member 17 extends from the plate 8 to the plate 1. See Figure 5. The width of the partition member 17 is less than the width of the compartment 16.

Secured to each partition member 17, abutting against and secured to the inner face of each plate 13 and extending to the forward end of each frame 7 at the outer side thereof is a curved partition member 18 which in connection with a portion of a plate 11, a plate 10 and the plates 1 and 8 provides a combined collecting and storage chamber 21 for the picked cotton. The chamber 21 normally opens at its rear into a chamber 22 formed rearwardly of the partition member 17 and provided by the latter, a plate 14, a plate 12, a plate 11, the rear portion of the plate 8 and the top plate 1. The compartment 21 opens at its forward end through the open portion at the forward end of the outer side of a frame 7 and the outlet for said chamber 21 is indicated at 23, which is normally closed by a hinged door 24. Positioned within each chamber 21 is a hinged ejector 25 for the collected cotton. The arrangement of the door 24 and ejector 25 will be hereinafter referred to, as well as the operating means for said door 24 and ejector 25.

Positioned within each chamber 22 is a vertically disposed rotatable drum 26 having a closed, concave head 27 and further having its periphery formed with vertically disposed dove-tailed grooves 28 of a length to extend from the upper to the lower end of the drum. The grooves 28 are equally spaced from each other. The bottom of the concavity formed in the head 27, axially thereof, is provided with a vertical disposed socketed protuberance 29 to which is fixedly secured a horizontally disposed beveled pinion 30. The lower end of the drum 26, axially thereof, carries a shaft 31 which is journaled in the support 16' at a point between the transverse median of the latter and its inner end. The drum 26 extends in close proximity, but is spaced from, the slots 15 formed in the plate 14.

Extending rearwardly from the partition member 18 into the chamber 22 and surrounding, as well as arranged in spaced relation with respect to the drum 26 is a stripper plate 32 of volute curvature and formed with lengthwise extending, superposed grooves 33. The rear end of the stripper plate 32 is connected to a series of superposed track members 34 corresponding in number to the number of grooves 33. The track members 34 are interposed between the drum 26 and the slotted portion of the plate 14. See Figure 4. The curvature of the stripper plate 32 is such as to provide for said plate from its rear end to gradually project from the drum 26, or whereby the space between the stripper plate 32 and drum 26 gradually increases from the rear end of said plate in a direction toward the partition member 18. See Figure 4. By this arrangement the stripper plate 32 is eccentrically disposed with respect to the drum 26. The plate 32 is provided with flanges as at 32' for forcing the cotton from off the picker members to be presently referred to.

Arranged between the plates 1 and 8 at the rear of the chamber 22, as well as being secured to the frame and to said plates 1 and 8, is a vertically disposed support 35 to which is attached a series of superposed, spaced, forwardly extending supports 36 which are secured to the rear portion of the stripper plate 32 between the slots 33. See Figure 5. The supports 36 form a series of superposed guide passages 37 for a purpose to be presently referred to. The supports 36 extend to the plate 14 and abut the same between the slots 15 thereof.

Secured in each groove 28 of each of the drums 26 is a vertically disposed, beveled, flat bar 38 provided with a series of openings 39 for the passage of holdfast devices 40 to fixedly secure the carrier in position. The thickness of the carrier is greater than the depth of the groove 28 whereby the carrier will project from the periphery of the drum. See Figure 8. Projecting outwardly from each carrier 38, is a series of superposed, spaced yokes 41 each formed at its front with an opening 42. See Figure 8.

Supported by each yoke 41 is a rotatable picker member consisting of a spindle formed of a tapered outer portion 43 and a reduced inner portion 44 which extends through the opening 42 and has connected therewith a roller 45 which is arranged within the yoke 41. The tapered outer portion 43 is formed with a pair of diametrically disposed lengthwise extending grooves 46. See Figure 9.

Anchored in the portion 43 of the spindle is two sets of picker fingers. One set is indicated at 47 and the other set at 48. The sets are oppositely disposed. The picker fingers are positioned in and project from the grooves 46. The bases of the picker fingers are below the radius of the circumference of the spindle and this allows for the fingers to bend in the grooves. The inner end of each spindle is loosely mounted in a carrier as indicated at 49. See Figure 7. Each roller 45 is of metal and provided with a rubber tread 50. See Figure 7.

The machine includes a pair of supporting wheels 51, 52, each carried by an independent axle 53. The wheels 51, 52 are fixed to the axles 53 so that these latter will rotate with the wheels. Each axle extends into a chamber 22. Associated with each axle 53 is an inverted yoke-shaped hanger 54 which extends through an opening 55 in the plate 1 and has its lower part arranged in the upper portion of the chamber 22. A bearing element 56 is provided for the axles 53 and which is arranged in the upper portion of the chamber 22. The axle 53 extends through the side plate 11 and is formed with stop collars 57. The axle 53 is journaled in the lower part of the hanger 54 and carries a beveled gear 58 which meshes with the pinion 30 whereby on the operation of the axle 53 the drum 26 will be rotated. The pinion 30 has a shaft 59, one end of which is fixed to the protuberance 29 and the other end is loosely mounted in one of the arms of the hanger 54. See Figure 2.

The door 24 is carried by a vertically disposed shaft 60 which is connected to the bottom plate 8 and extends up through the wider portion 3 of the top plate 1 and carries on its projecting end a cog pinion 61. See Figures 4 and 1. The ejector 25 is fixed to a spring controlled shaft 62, see Figures 1 and 4. The shaft 62 is supported by the bottom plate 8 and extends up through the portion 3 of the top plate 1 and is arranged in alignment with the shaft 60. That part of the shaft 62 which projects above the plate 1 is provided with a grooved pulley 63 in a cog pinion 64. Winding on the pulley 3 is a flexible pull member 65, which travels against a guide pulley 66 and is connected to a lever member 67 carrying a dog 68, which associates with a rack 69 for retaining the lever 67 in adjusted position. Traveling around the pinions 61 and 64 is a chain 69', the function of which is to shift the door 24 on the operation of the shaft 62.

It will be assumed that the door 24 and ejector 25 are in the position as shown in Figure 4. Now if it be desired to open the chamber 21 and eject the collected cotton therefrom, the lever member 67 is actuated in a direction to pull the member 65 rearwardly, which in turn will shift the shaft 62 in a direction to swing the ejector member 25 in the direction of the arrow 25' shown in Figure 4, whereby the ejector member 25 coming in contact with the collected cotton will force the same through the outlet 23. As the ejector member 25 is moved in the direction of the arrow 25', Figure 4, the shaft 60 will be operated whereby the door 24 will be swung in the direction of the arrow 25'', Figure 4, to open the outlet 23 under such conditions the ejector member 25 sweeping against the collected cotton in the chamber 21 will force the cotton in bulk from the chamber 21. When the lever 67 is released the controlling spring 70 for the shaft 62 will operate it in the opposite direction and cause the door 24 and ejector member 25 to assume a position as shown in Figure 4.

Connected to each side plate 13, at the forward end thereof, and disposed at an outward inclination with respect thereto, is a deflector member 71 for tipping the plant inwardly so that the plant will ride against the plate 13. See Figure 4. As the machine travels forwardly, the drums 26 will operate in an opposite direction with respect to each other whereby the picker members will be moved to operate on each side of the plant to pick the cotton therefrom. See Figure 4. As the drums 26 revolve the rollers or wheels 45 will travel on the track members 34 and the spindles of picked cotton will pass between the slots 33 of the stripper plate and as the curvature thereof gradually projects from the drums 26, the stripper plate will act upon the spindles to remove the picked cotton therefrom and in this connection. See Figure 4. The spindles, or that portion provided with the picked cotton will pass through the passages 37 and said passages are of greater height than the width of the slots 33.

Secured to the rear of the portion 2 of the top plate 1, and projecting rearwardly therefrom is a seat post 72 carrying a seat 73 for the driver. Secured to the plate 1 and extension 6 is a tongue 74 to which the horses can be attached.

The arrangement of the stripper plate with respect to the drums and picker members will provide for the picked cotton being gradually removed from the picker members during the revolving of the drums whereby the removal of the picked cotton will be had from a picker member when the latter passes through the inner end of a slot 33. Under such conditions the removed cotton will drop on the curved partition member 18. See Figure 4. The manner in which the picker members operate with respect to the plant is as shown in Figure 4.

It is thought the many advantages of a cotton picker, in accordance with this invention, can be readily understood, and although the preferred embodiment of the invention is as illustrated and described, yet it is to be understood that changes in the details of construction can be had which fall within the scope of the invention as claimed.

What I claim is:

1. In a cotton picker, a compartment, a collecting chamber forwardly of and opening at its rear into said compartment, a vertically disposed rotatable drum arranged eccentrically of and within said compartment, the inner side wall of the latter having superposed guide slots for picker members, a plurality of spaced vertically disposed carriers secured to the outer periphery of the drum, a set of superposed spaced picker members rotatably supported from each carrier and traveling through said slots, said sets of picker members being radially disposed with respect to said drum, and a slotted stripper plate for removing the cotton from said picker members and discharging it into said collecting chamber, said stripper plate having its rear end positioned in proximity to said inner side wall, opposing in spaced relation and increasing in spaced relation from its rear to its front with respect to said drum and having its forward part terminating at the opening at the rear of said chamber.

2. In a cotton picker, a compartment, a collecting chamber forwardly of and opening at its rear into said compartment, a vertically disposed rotatable drum arranged eccentrically of and within said compartment, the inner side wall of the latter having superposed guide slots for picker members, a plurality of spaced vertically disposed carriers secured to the outer periphery of the drum, a set of superposed spaced picker members rotatably supported from each carrier and traveling through said slots, said sets of picker members being radially disposed with respect to said drum, a slotted stripper plate for removing the cotton from said picker members and discharging it into said collecting chamber, said stripper plate having its rear end positioned in proximity to said inner side wall, opposing in spaced relation and increasing in spaced relation from its rear to its front with respect to said drum and having its forward part terminating at the opening at the rear of said chamber, each of said members being peripherally grooved, having a roller at its inner end and picker fingers projecting from the grooves thereof, and track members spaced from said drum and engaged by said rollers for rotating the picker members.

3. In a cotton picker, a compartment, a collecting chamber forwardly of and opening at its rear into said compartment, a vertically disposed rotatable drum arranged eccentrically of and within said compartment, the inner side wall of the latter having superposed guide slots for picker members, a plurality of spaced vertically disposed carriers secured to the outer periphery of the drum, a set of superposed spaced picker members rotatably supported from each carrier and traveling through said slots, said sets of picker members being radially disposed with respect to said drum, a slotted stripper plate for removing the cotton from said picker members and discharging it into said collecting chamber, said stripper plate having its rear end positioned in proximity to said inner side wall, opposing in spaced relation and increasing in spaced relation from its rear to its front with respect to said drum and having its forward part terminating at the opening at the rear of said chamber, and each of said members being peripherally grooved, having a roller at its inner end and picker fingers projecting from the grooves thereof.

4. In a cotton picker, a rotatable, vertically disposed drum, a plurality of spaced vertical carriers secured to the periphery thereof, a set of superposed, radially disposed picker members rotatably supported from each carrier, a collecting chamber arranged forwardly of said picker members having an entrance at its rear, stripping means of volute curvature enclosing said drum, terminating at one end at said entrance for removing the cotton from said picker members and discharging it into said collecting chamber, track members spaced from said drum and engaged by the rollers for rotating said picker members.

5. A cotton picker comprising a mobile body having a pair of opposed, spaced compartments each provided with communicating front and rear chambers, a pair of opposed, picker mechanisms rotating in opposite directions and each arranged in a rear chamber and projecting from the inner side of a compartment, and a slotted stripper plate arranged in each rear chamber and extending to the rear of a front chamber, each stripper plate opposing in spaced relation and increasing in spaced relation from its rear to its front with respect to a picker mechanism for stripping the cotton therefrom and discharging it into a front chamber.

6. A cotton picker comprising a mobile body having a pair of opposed, spaced compartments each provided with communicating front and rear chambers, a pair of opposed, picker mechanisms rotating in opposite directions and each arranged in a rear chamber and projecting from the inner side of a compartment, a slotted stripper plate arranged in each rear chamber and extending to the rear of a front chamber, each stripper plate opposing in spaced relation and increasing in spaced relation from its rear to its front with respect to a picker mechanism for stripping the cotton therefrom and discharging it into a front chamber, a pair of independent, rotatable rear axles connected to said body and each extending into a rear chamber, an operative drive connection between the inner end of an axle and a picker mechanism, and a supporting wheel connected to each axle adjacent each side of said mobile body.

7. A cotton picker comprising a mobile body having a pair of opposed, spaced compartments each provided with communicating front and rear chambers, a pair of opposed, picker mechanisms rotating in opposite directions and each arranged in a rear chamber and projecting from the inner side of a compartment, stripper means arranged in said rear chambers and coacting with said mechanisms for stripping the cotton therefrom for discharge into said front chambers, and means in said rear chambers to provide guide passages for the cotton carried by said picker mechanisms.

8. A cotton picker comprising a mobile body having a pair of opposed, spaced compartments each provided with communicating front and rear chambers, a pair of opposed, picker mechanisms rotating in opposite directions and each arranged in a rear chamber and projecting from the inner side of a compartment, stripper means arranged in said rear chambers and coacting with said mechanisms for stripping the cotton therefrom for discharge into said front chambers and a pair of independent, rotatable rear axles connected to said body and each extending into a rear chamber, an operative drive connection between the inner end of an axle and a picker mechanism, a supporting wheel connected to each axle adjacent each side of said mobile body, and means in said rear chambers to provide guide passages for the cotton carried by said picker mechanisms.

9. A cotton picker comprising a mobile body having a pair of opposed, spaced compartments and each having the inner wall at the rear thereof formed with superposed slots, means within each of said compartments to provide communicating front and rear chambers, a pair of opposed picker mechanisms rotating in opposite directions and each arranged in a rear chamber and projecting through said slots during the operation of said mechanisms, and slotted stripper plates of volute curvature arranged in said rear chambers and extending from a point in proximity to said rear walls to the rear of said front chambers, said plates opposing in spaced relation and increasing in spaced relation with respect to said mechanisms and coacting with these latter for stripping the cotton therefrom, and for discharging the cotton in said front chambers.

10. A cotton picker comprising a mobile body having a pair of opposed, spaced compartments each having the inner wall at the rear thereof formed with superposed slots, means within each of said compartments to provide communicating front and rear chambers, a pair of opposed picker mechanisms rotating in opposite directions and each arranged in a rear chamber and projecting through said slots during the operation of the mechanisms, stripper means of volute curvature arranged in said rear chambers and extending from a point in proximity to said slots to the rear of said front chambers and further gradually spaced from and surrounding said mechanisms and further coacting with these latter for stripping the cotton therefrom for the discharge of the cotton in said front chambers, and means arranged in each of said rear chambers to provide guide passages for the cotton when carried by said mechanisms.

11. In a cotton picker, a mobile body, a pair of endwise opposed, spaced, rotatable axles connected to said body, a supporting wheel fixed to the outer end of each axle exteriorly of said body, a pair of spaced, opposed, vertically disposed oppositely rotating picker mechanisms carried by said body, an operative drive connection between each mechanism and the inner end of an axle, and each of said mechanisms having a closed concaved head to provide a clearance for its drive connection.

12. In a cotton picker, a mobile body, a pair of endwise opposed, spaced, rotatable axles connected to said body, a supporting wheel fixed to the outer end of each axle exteriorly of said body, a pair of spaced, opposed, vertically extending, oppositely rotating picker mechanisms carried by said body, an operative drive connection between each mechanism and the inner end of an axle, each of said mechanisms having a closed concaved head to provide a clearance for its drive connection, said body provided with a pair of collecting chambers, and stripper means within said body rearwardly of said chambers and coacting with said picker mechanisms for stripping the cotton therefrom to discharge into said collecting chambers.

13. In a cotton picker, a mobile body, a pair of endwise opposed, spaced, rotatable axles connected to said body, a supporting wheel fixed to the outer end of each axle exteriorly of said body, a pair of spaced, opposed, vertically extending, oppositely rotating picker mechanisms carried by said body, an operative drive connection between each mechanism and the inner end of an axle, each of said mechanisms having a closed concaved head to provide a clearance for its drive connection, said body provided with a pair of collecting chambers, and stripper means within said body rearwardly of said chambers and coacting with said picker mechanisms for stripping the cotton therefrom to discharge into said collecting chambers.

14. In a cotton picker, a mobile structure provided with a pair of opposed, spaced collecting chambers for picked cotton, each provided with a discharge opening in its outer side, an outwardly opening closure for the opening and an ejector for the collected cotton, and means common to each ejector and a closure for simultaneously operating them to discharge the collected cotton in bulk.

15. In a cotton picker, a collecting chamber for the picked cotton, said chamber having a discharge opening, an outwardly swinging closure for said opening, an ejector within said chamber, and means for simultaneously shifting the ejector and closure in a like direction to discharge the cotton in bulk from said chamber.

16. In a cotton picker, a rotatable, vertically disposed drum, a plurality of spaced, vertical carriers secured to the periphery thereof, a set of superposed, radially disposed picker members rotatably supported from each carrier, a collecting chamber arranged forwardly of said picker members and having an entrance at its rear, stripping means of volute curvature surrounding said drum and spaced therefrom and providing for removing the cotton from said picker members to enter said collecting chamber at the rear of the latter, track members for said picker members interposed between said drum and said stripping means, and passages for the picker members and cotton carried thereby positioned on that side of said stripping means opposite the side on which is arranged the track members for the picker members.

17. A cotton picker comprising a mobile body having a pair of opposed, spaced compartments provided with communicating front and rear chambers, said front chambers providing collecting chambers for the picked cotton, a pair of opposed picker mechanisms rotating in opposite directions and each arranged in a rear chamber and projecting from the inner side of a compartment, stripper means of volute curvature arranged in said rear chambers, encompassing and spaced from said mechanisms and coacting with these latter for stripping the cotton therefrom for discharge into said front chambers, means to provide superposed passages between said stripping means and the inner walls of said compartments for the passage of the cotton upon said picker mechanisms, and track members positioned between said picker mechanisms and said stripping means and providing tracks for elements of said picker mechanisms.

In testimony whereof, I affix my signature hereto.

JAMES M. HOOD.